United States Patent
Wang et al.

(10) Patent No.: US 9,390,166 B2
(45) Date of Patent: Jul. 12, 2016

(54) SPECIFIC ONLINE RESOURCE IDENTIFICATION AND EXTRACTION

(71) Applicant: FUJITSU LIMITED, Kawasaki-shi, Kanagawa (JP)

(72) Inventors: Jun Wang, San Jose, CA (US); Kanji Uchino, San Jose, CA (US)

(73) Assignee: FUJITSU LIMITED, Kawasaki (JP)

(*) Notice: Subject to any disclaimer, the term of this patent is extended or adjusted under 35 U.S.C. 154(b) by 286 days.

(21) Appl. No.: 13/732,036

(22) Filed: Dec. 31, 2012

(65) Prior Publication Data
US 2014/0188882 A1   Jul. 3, 2014

(51) Int. Cl.
*G06F 17/30* (2006.01)

(52) U.S. Cl.
CPC .... *G06F 17/30707* (2013.01); *G06F 17/30864* (2013.01)

(58) Field of Classification Search
CPC ................................ G06F 17/30; G06F 17/00
See application file for complete search history.

(56) References Cited

U.S. PATENT DOCUMENTS

| | | | | |
|---|---|---|---|---|
| 7,765,236 B2* | 7/2010 | Zhai | ............... | G06F 17/30896 707/797 |
| 8,117,203 B2* | 2/2012 | Gazen | ............... | G06F 17/30861 707/737 |
| 8,285,701 B2* | 10/2012 | Swart et al. | ............... | 707/709 |
| 8,311,835 B2* | 11/2012 | Lecoeuche | ............... | H04M 1/72561 704/270 |
| 8,375,073 B1* | 2/2013 | Jain | ............... | G06F 17/3053 707/729 |
| 8,738,643 B1* | 5/2014 | Czuba et al. | ............... | 707/767 |
| 2002/0065842 A1* | 5/2002 | Takagi | ............... | G06F 17/30905 709/217 |
| 2004/0073431 A1* | 4/2004 | Galanes | ............... | G06F 9/4443 704/270.1 |
| 2004/0113908 A1* | 6/2004 | Galanes | ............... | H04M 1/72561 345/418 |
| 2004/0230434 A1* | 11/2004 | Galanes | ............... | H04M 3/42204 704/270.1 |
| 2004/0230637 A1* | 11/2004 | Lecoueche | ............... | G10L 15/20 709/200 |
| 2005/0066269 A1 | 3/2005 | Wang et al. | | |
| 2005/0091059 A1* | 4/2005 | Lecoeuche | ............... | H04M 1/72561 704/270.1 |
| 2006/0026496 A1* | 2/2006 | Joshi | ............... | G06F 17/30896 715/205 |
| 2007/0033531 A1* | 2/2007 | Marsh | ............... | G06Q 30/02 715/738 |
| 2008/0098300 A1* | 4/2008 | Corrales | ............... | G06F 17/30896 715/243 |

(Continued)

FOREIGN PATENT DOCUMENTS

WO   WO 2009059481 A1 *  5/2009   ........ G06F 17/30861

OTHER PUBLICATIONS

Lim et al., "Multiple sets of features for automatic genre classification of web documents", Information Processing and Management, 2005, 41: pp. 1263-1276.

(Continued)

*Primary Examiner* — Farhan Syed
(74) *Attorney, Agent, or Firm* — Maschoff Brennan

(57) ABSTRACT

A method of automatically identifying and extracting distributed online resources may include locating in a website a candidate entry list page. The method may also include verifying the candidate entry list page as an entry list page using repeated pattern discovery. The method may also include segmenting the entry list page into a plurality of entry items. The method may also include extracting from the plurality of entry items a plurality of candidate target pages. The method may also include verifying at least some of the candidate target pages as target pages including analyzing a visual structure and presentation of the candidate target pages. The method may also include extracting metadata from the target pages. The method may also include organizing the target pages and/or the metadata in one or more databases.

19 Claims, 12 Drawing Sheets

(56) References Cited

U.S. PATENT DOCUMENTS

| | | | | |
|---|---|---|---|---|
| 2008/0114800 | A1* | 5/2008 | Gazen | G06F 17/30861 |
| 2008/0313260 | A1* | 12/2008 | Sweet et al. | 709/201 |
| 2010/0145902 | A1* | 6/2010 | Boyan | G06F 17/3089 706/54 |
| 2011/0185273 | A1* | 7/2011 | DaCosta | G06Q 99/00 715/234 |
| 2011/0282877 | A1* | 11/2011 | Gazen | G06F 17/30861 707/737 |
| 2012/0330952 | A1* | 12/2012 | Kong | G02F 17/30864 707/737 |

OTHER PUBLICATIONS

Rehm, George, "Language-Independent Text Parsing of Arbitrary HTML-Documents. Towards a Foundation for Web Genre Identification", LDV Forum, Band 20 (2), special issue Corpus Linguistics, 2005, pp. 53-74.

Levering et al., "Using Visual Features for Fine-Grained Genre Classification of Web Pages", Proceedings of the 41st Hawaii International Conference on System Sciences—2008, pp. 1-10.

Xiong et al., "OfCourse: web content discovery, classification and information extraction for online course materials", 18th ACM Conference on Information and Knowledge Management 2009: 2077-2078.

Luo et al., "Towards combining web classification and web information extraction: a case study", 15th ACM SIGKDD International Conference on Knowledge Discovery and Data Mining 2009: 1235-1244.

Cai et al., "VIPS: a Vision-based Page Segmentation Algorithm", Technical Report MSR-TR-2003-79, Microsoft Research, 2003.

\* cited by examiner

Brand X Laptops and Notebooks for Business

Refine Your Search

⊞ Laptop Screen Size
- ☐ 10"
- ☐ 13"-14"
- ☐ 15"-16"

⊞ Processor ⓘ
- ☐ Intel Core i7 Extreme
- ☐ Intel Core i7
- ☐ Intel Core i5
- ☐ Intel Core i3
- ☐ Intel Atom
- ☐ NEW! 3rd Gen Intel Core i5
- ☐ NEW! 3rd Gen Intel Core i7

⊞ Operating System ⓘ
- ☐ Windows 7
- ☐ Free DOS and Linux
- ☐ 64-BIT OS

Recommendations for you:

Viewing 1-5 of 15

— 402

Model 1 — ★★★★☆ (110 Reviews) Starting at $699.00 — Customize >

Model 2 — ★★★★☆ (39 Reviews) Starting at $799.00 — Customize >

Model 3 — ★★★★★ Write A Review Starting at $499.00 — Customize >

Model 4 — ★★★★☆ (40 Reviews) Starting at $1299.00 — Customize >

Model 5 — ★★★★☆ (8 Reviews) Starting at $1389.00 — Customize >

*Fig. 4B*

SPECIFIC ONLINE RESOURCE IDENTIFICATION AND EXTRACTION

FIELD

The embodiments discussed herein are related to specific online resource identification and extraction.

BACKGROUND

For many specific types of information, many valuable resources are scattered in a large number of distributed sites around the Web. Some attempts have been made to aggregate at least a portion of some types of information at one or more central information sites. For example, there are a relatively small number of open courseware (OCW) web sites that attempt to maintain repositories of open education resources, such as courses and associated learning materials. Generally, the maintenance of these repositories is performed manually and, due to the quantity of available resources and the inherent limits of manual maintenance, many courses and associated learning materials and/or other open education resources remain sparsely distributed around the Web.

As another example, the same products may be sold from a variety of different sites, such as e-commerce sites, manufacturer sites, individual retail sites, and so on. Each of the different sites may include resources such as detailed product information, user reviews of the products, and pricing information. At present, accessing the resources associated with the products generally requires visiting each of the different sites as the resources have not been centrally aggregated.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of automatically identifying and extracting distributed online resources may include locating in a website a candidate entry list page. The method may also include verifying the candidate entry list page as an entry list page using repeated pattern discovery. The method may also include segmenting the entry list page into a plurality of entry items. The method may also include extracting from the plurality of entry items a plurality of candidate target pages. The method may also include verifying at least some of the candidate target pages as target pages including analyzing a visual structure and presentation of the candidate target pages. The method may also include extracting metadata from the target pages. The method may also include organizing the target pages and/or the metadata in one or more databases.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIGS. 4A and 4B include screenshots of example candidate entry list pages that may be pointed to by a corresponding link in a link list;

FIG. 10 includes a screenshot of an example candidate course page pointed to by a link in the candidate target page of FIG. 7a.

DESCRIPTION OF EMBODIMENTS

Figure 1:
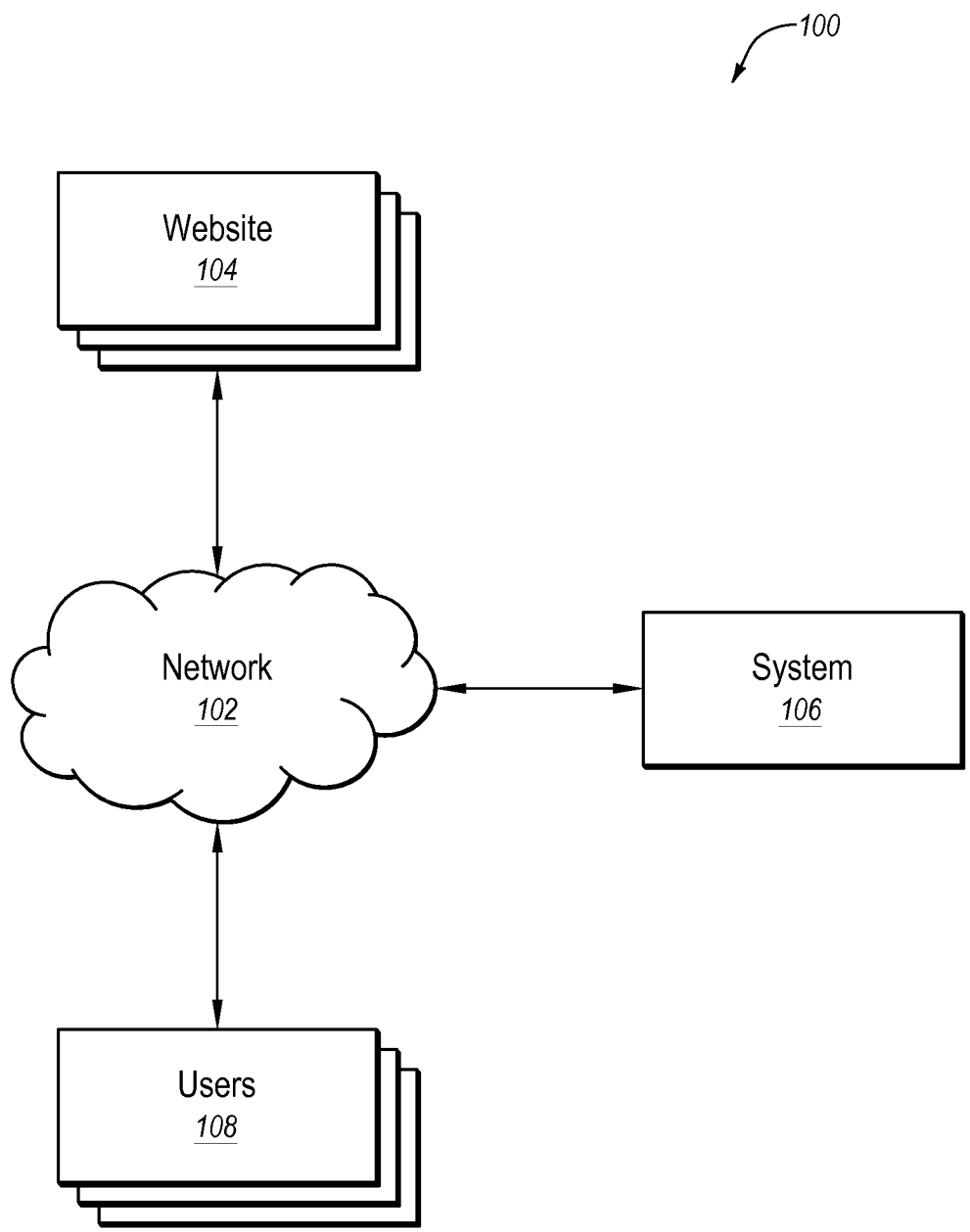
FIG. 1 is a block diagram of an example operating environment in which some embodiments may be implemented.

Some example embodiments described herein generally relate to systems and methods of automatically identifying and extracting specific online resources belonging to any of a variety of specific types or genres of web pages. Example genres include, but are not limited to, product pages, faculty member home pages, course pages, or the like or any combination thereof. Some embodiments of automatically identifying and extracting specific online resources may identify entry list pages leading to target pages using repeated patterns and/or may verify target pages and extract metadata using visual structure and presentation, anchor text features, and/or URL features.

In more detail, an identification and extraction system (hereinafter "system") may locate in a website, such as the website of a particular school or department of a university or other educational institution, a candidate entry list page. For example, the candidate entry list page may be located by running a keyword search in links of the home page of the department for "faculty" or some other target keyword, where the links that contain the target keyword point to candidate entry list pages. In the present example, the desired entry list page is a faculty directory for the department such that any links of the home page of the department that include "faculty" may likely be pointing to the faculty directory. Other target keywords may be used when other types of entry list pages are desired.

The system may verify the candidate entry list page as an entry list page using repeated pattern discovery. For example, if the desired entry list page is a faculty directory, the candidate entry list page may be fetched and analyzed to detect a repeating pattern that is consistent with being a faculty directory. As an example, if the candidate entry list page has a repeating pattern of names—e.g., corresponding to the names of the faculty members of the department—the candidate entry list page may be verified as an entry list page.

The system may segment the entry list page into multiple entry items. In some embodiments, segmenting the entry list page into entry items may include detecting a document object model (DOM) level in a DOM tree of the entry list page where each instance of the detected repeating pattern is in a different branch of the DOM tree than the other instances. The detected DOM level may be selected as a border of the entry items and the entry list page may be segmented into the different branches of the DOM tree that each correspond to a different one of the entry items. For instance, some faculty directories include a DOM tree in which the name, phone number, office, and/or email address of each listed faculty member is in a different branch than the name, phone number, office, and/or email address of other listed faculty members.

The system may extract candidate target pages from the entry items. In some embodiments, this includes, for each entry item, identifying one or more links in the entry item that point to a corresponding page that is then considered a candidate target page. For example, in some faculty directories, the name of each faculty member is a link in the form of anchor text that points to a home page of the faculty member, and/or each entry item in the faculty directory may include a separate "home," "home page," "personal page," or other anchor text that points to the home page of the faculty member.

The system may verify at least some of the candidate target pages thus extracted as target pages, including analyzing a visual structure and presentation of the candidate target pages. For each candidate target page, this may include fetching the candidate target page using the corresponding link found in the corresponding entry list item and then extracting one or more features, including keyword features, URL features, and/or anchor text features, from the candidate target page. The candidate target page may then be classified as belonging to a particular genre of pages, such as faculty member home pages in the present example, based on the extracted features.

Keyword extraction from the candidate target page may include analyzing the visual structure and presentation of the candidate target page to identify information blocks in the candidate target page and extracting one or more keywords from the information blocks based on the visual position of each of the one or more keywords within a corresponding one of the information blocks. For instance, faculty member home pages are often divided into or have links to various information blocks such as one or more courses the faculty member is teaching or has taught in the past. Thus, if an identified information block has a keyword such as "classes," "courses," "teaching," or other analogous keyword as the title or header of the information block, that keyword and visual position may be extracted in the keyword features and may contribute to the classification of the candidate target page as a faculty member home page.

The system may extract metadata from the verified target pages, e.g., those candidate target pages that have been classified as belonging to a particular genre of pages. For faculty member home pages, for instance, the system may extract a name of the faculty member, a name of the corresponding educational institution, a course information block including one or more courses taught by the faculty member, one or more publications by the faculty member, and the like. The system may then organize the target pages and/or the metadata in one or more databases.

If the course information block includes a link to each of multiple different courses, the system may consider the course information block as an entry list page and may at least partially repeat the steps described above. For instance, the system may segment the course information block into multiple entry items corresponding to each course and may extract from the entry items candidate course pages that may be verified as such, followed by metadata extraction and organizing the course pages and/or the extracted metadata in the one or more databases. This may continue at each level until all desired information has been extracted. For example, each course page may be divided into one or more information blocks corresponding to specific metadata, such as lecture notes, homework assignments, syllabi, supplemental learning materials, or other course metadata. Some information blocks, such as the lecture notes information block, may be segmented into entry items that may all be extracted from the corresponding course page and then organized in the one or more databases.

Embodiments of the present invention will be explained with reference to the accompanying drawings.

FIG. 1 is a block diagram of an example operating environment 100 in which some embodiments may be implemented. The operating environment 100 may include a network 102, one or more websites 104, an identification and extraction system (hereinafter "system") 106, and one or more end users (hereinafter "users") 108.

In general, the network 102 may include one or more wide area networks (WANs) and/or local area networks (LANs) that enable the websites 104, the system 106, and/or the users 108 to communicate with each other. In some embodiments, the network 102 includes the Internet, including a global internetwork formed by logical and physical connections between multiple WANs and/or LANs. Alternately or additionally, the network 102 may include one or more cellular RF networks and/or one or more wired and/or wireless networks such as, but not limited to, 802.xx networks, Bluetooth access points, wireless access points, IP-based networks, or the like. The network 102 may also include servers that enable one type of network to interface with another type of network.

The websites 104 may be hosted by one or more corresponding web servers communicatively coupled to the Internet and include distributed online resources such as product information, course information including lecture notes and/or other learning materials, or other online resources. Accordingly, the websites 104 may include websites of product manufacturers, merchants, high schools, colleges, universities, other educational institutions, or the like or any combination thereof.

The system 106 accesses the websites 104 via the network 102 to identify and extract distributed online resources from the websites 104. The system 106 may include or be coupled to one or more databases in which the identified and extracted resources, and/or metadata associated therewith, may be organized. The system 106 may provide access to the databases to the users 108.

The users 108 include people and/or other entities that desire to query the system 106 for particular online resources that have been identified and extracted by the system 106. Although not separately illustrated, each of the users 108 typically communicates with the network using a corresponding computing device. Each of the computing devices may include, but is not limited to, a desktop computer, a laptop computer, a tablet computer, a mobile phone, a smartphone, a personal digital assistant (PDA), or other suitable computing device.

Figure 2:
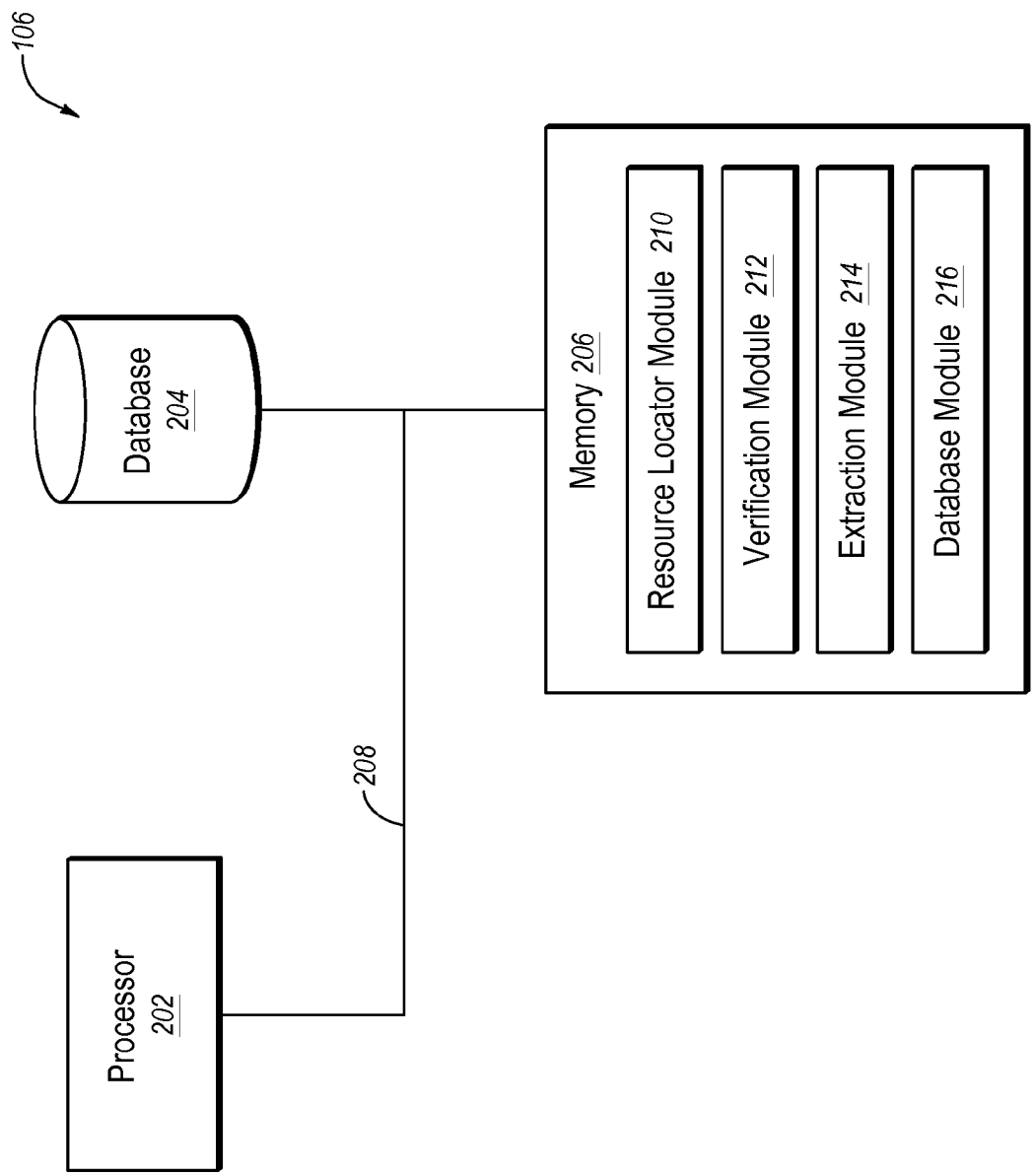
FIG. 2 is a block diagram of an example embodiment of a system that may be included in the operating environment of FIG. 1.

FIG. 2 is a block diagram of an example embodiment of the system 106 of FIG. 1, arranged in accordance with at least one embodiment described herein. As illustrated, the system 106 includes a processor 202, one or more databases 204, a memory 206, and a communication bus 208. Although not shown, the system 106 may further include a communication interface that facilitates communication over a network; the communication interface may be implemented as, for example, a network interface card, a network adapter, a LAN adapter, or other suitable communication interface.

The processor 202 may be configured to execute computer instructions that cause the system 106 to perform the functions and operations described herein, such as locating candidate entry list pages, verifying at least some of the candidate entry list pages as entry list pages using repeated pattern discovery, segmenting each of the entry list pages into multiple entry items, extracting candidate target pages from the entry items, verifying at least some of the candidate target pages as target pages including analyzing a visual structure and presentation of the candidate target pages, extracting metadata from the target pages, and organizing the target pages and/or the metadata in one or more databases. The processor 202 may include, but is not limited to, a processor, a microprocessor (µP), a controller, a microcontroller (µC), a central processing unit (CPU), a digital signal processor (DSP), any combination thereof, or other suitable processor.

Computer instructions may be loaded into the memory 206 for execution by the processor 202. For example, the computer instructions may be in the form of one or more modules, such as, but not limited to, a resource locator module 210, a verification module 212, an extraction module 214, and/or a database module 216 (collectively "modules 210, 212, 214, 216"). Execution of the modules 210, 212, 214, 216 by the processor 202 may cause the system 106 to perform the functions and operations as described herein. In some embodiments, data generated, received, and/or operated on during performance of the functions and operations may be at least temporarily stored in the memory 206. Moreover, the memory 206 may include volatile storage such as random access memory (RAM). More generally, the system 106 may include a tangible computer-readable storage medium such as, but not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible computer-readable storage medium.

The processor 202, the database 204, and the memory 206 may be communicatively coupled via the communication bus 208. The communication bus 208 may include, but is not limited to, a memory bus, a storage interface bus, a bus/interface controller, an interface bus, or the like or any combination thereof.

The resource locator module 210 may be configured to locate candidate entry list pages in websites, such as the websites 104 of FIG. 1.

The verification module 212 may be configured to verify candidate entry list pages as entry list pages using repeated pattern discovery and to segment the entry list page into entry items.

The extraction module 214 may be configured to extract candidate target pages from the entry list items.

The verification module 212 may be further configured to verify at least some of the candidate target pages as target pages including analyzing a visual structure and presentation of the candidate target pages.

The extraction module 214 may be further configured to extract metadata from the target pages.

The database module 216 may be configured to organize the target pages and/or the metadata in the database 204 (or in multiple databases).

To the extent extracting all desired information involves delving multiple levels into a multi-level hierarchical arrangement of web pages (e.g., faculty member home pages that point to course pages that point to learning materials), each of the modules 210, 212, 214, 216 may perform corresponding functions at each level.

For example, when the target pages are faculty member home pages, the extracted metadata may include a course information block that the verification module 212 may segment into an entry list of candidate course pages. The extraction module 214 may extract the candidate course pages from the entry list of candidate course pages and the verification module 212 may verify the candidate course pages as course pages. The extraction module 214 may additionally extract course metadata from the course pages; the extracted metadata may include a learning materials information block. The foregoing process may then cycle down to the next level in which the verification module 212 may segment the learning materials information block into an entry list of candidate learning materials. The extraction module 214 may extract the candidate learning materials from the entry list of candidate learning materials and the verification module 212 may verify the candidate learning materials as learning materials. The database module 216 may organize the course metadata and learning materials in the database 204 (or in multiple databases).

Figure 3:
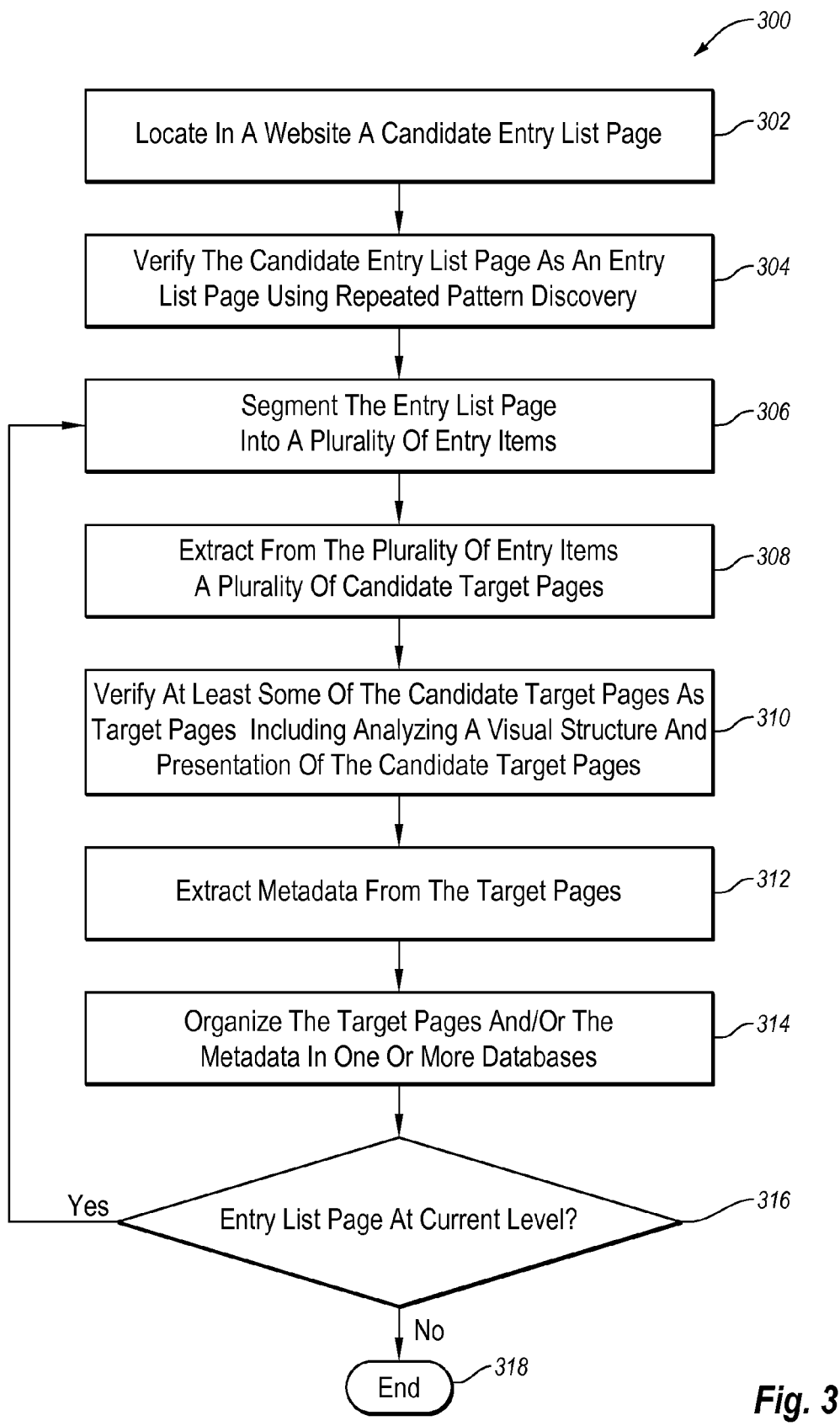
FIG. 3 shows an example flow diagram of a method of automatically identifying and extracting distributed online resources.

FIG. 3 shows an example flow diagram of a method 300 of automatically identifying and extracting distributed online resources, arranged in accordance with at least one embodiment described herein. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In some embodiments, the method 300 is performed by the system 106 of FIGS. 1-2, which may include the processor 202 of FIG. 2 executing computer instructions stored in the memory 206. For instance, the processor 202 of FIG. 2 may be configured to execute computer instructions such as the modules 210, 212, 214, 216 to perform functions and operations for automatically identifying and extracting distributed online resources as represented by one or more of the blocks of the method 300 of FIG. 3. Although illustrated as discrete blocks, various blocks may be divided into additional blocks, combined into fewer blocks, or eliminated, depending on the desired implementation.

The method may begin at block 302 in which a candidate entry list page is located in a website. In block 304, the candidate entry list page may be verified as an entry list page using repeated pattern discovery. In block 306, the entry list page may be segmented into a plurality of entry items. In block 308, a plurality of candidate target pages may be extracted from the plurality of entry items. In block 310, at least some of the candidate target pages may be verified as target pages including analyzing a visual structure and presentation of the candidate target pages. In block 312, metadata may be extracted from the target pages. In block 314, the target pages and/or the metadata may be organized in one or more databases. In block 316, it is determined whether there is an entry list page at a current level, e.g., whether there is an entry list page within a corresponding target page. If there is not an entry list page at the current level ("No" at block 316), the method 300 ends at block 318. If there is an entry list page at the current level ("Yes" at block 316), the method 300 may return to block 306 and repeat blocks 306, 308, 310, 312, 314, and/or 316.

In some embodiments, locating a candidate entry list page in the website at block 302 of FIG. 3 may include running a keyword search for one or more target keywords in links in a home page of the website. Each of the links may include anchor text, a URL, or the like or any combination thereof. For example, the term "faculty" may be searched for in links of an educational institution department home page to potentially locate a corresponding faculty directory as an entry list page. Alternately, the term "laptop" may be searched for in links of a computer manufacturer's website to potentially locate a product listing of laptop computers from that manufacturer as an entry list page. Alternately, the term "special" or "new car" may be searched for in links of a car deal website to potentially locate a product listing of specials or new cars from the car deal website as an entry list page. The foregoing are merely examples and one of skill in the art will appreciate, with the benefit of the present disclosure, that the particular target keywords may vary depending on the desired entry list page and online resources that are being identified and extracted.

Alternately or additionally, the candidate target list page may be located by running an Internet search using any appropriate combination of search terms. For example, if the desired entry list page is a faculty directory of a particular educational institution department, locating the candidate entry list page in the website may include running an Internet search using the department name or other identifier (e.g., "computer science" or "cs" for the computer science department), the name of the educational institution (e.g., "Stanford," "Harvard," or other name), and the term "faculty" as search terms. Alternately, if the desired entry list page is a product listing of a particular category or type of products from a particular manufacturer or merchant, locating the candidate entry list page in the website may include running an Internet search using the manufacturer or merchant name (e.g., "Dell," "Mazda," or other manufacturer/merchant name) and the name of the particular category or type of products (e.g., "laptop," "special," or other term) as search terms. Each hit returned by the Internet search may include a link pointing to a web page.

A link list may be created that includes links in which the one or more target keywords are found or that includes links corresponding to the hits returned by the Internet search. Each of the links may point to a web page that may be considered as a candidate entry list page. In some embodiments, the links in the link list may be ranked based on length or some other criteria; for example, shorter links may be ranked higher than longer links and may be processed in descending order beginning with higher rank until a candidate entry list page is verified as an entry list page or all of the links have been processed, whichever occurs first. Whether or not the links are ranked, at least one of the links from the link list may be "popped" or selected for further processing, the link pointing to a corresponding candidate entry list page.

Figure 4A:
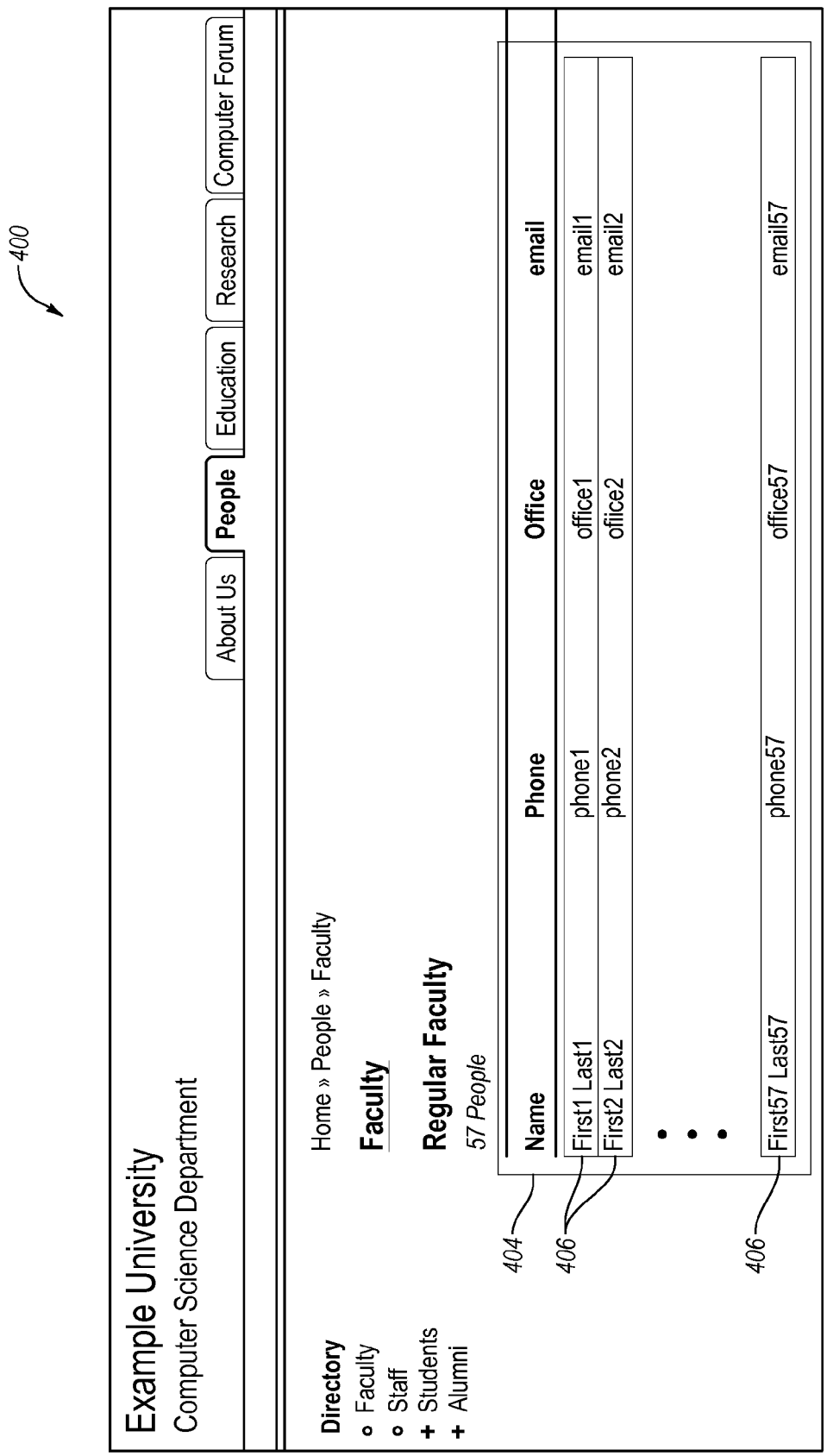

FIGS. 4A and 4B include screenshots of example candidate entry list pages 400, 402 that may be pointed to by a corresponding link in a link list, arranged in accordance with at least some embodiments described herein. In more detail, FIG. 4A depicts an example faculty directory of the computer science department in an educational institution named "Example University," and FIG. 4B depicts an example product listing of laptops from a manufacturer named "Brand X." As illustrated, the candidate entry list page 400 of FIG. 4A includes a table 404 including the names, phone numbers, office locations, and email addresses of the faculty in the computer science department of Example University. Various entry items 406 are included in the table 404 which may be segmented from the candidate entry list page 400 after the candidate entry list page 400 has been verified as an entry list page. The ellipses between the second and last entry items 406 indicate that there may be more entry items 406 in the table 404 than the three illustrated in FIG. 4A. More generally, the inclusion of ellipses in any of the Figures indicates that additional items, content, information, or the like may be included in the place of the ellipses and the ellipses have merely been provided to simplify the Figures.

In some embodiments, verifying a candidate entry list page as an entry list page using repeated pattern discovery at block 304 of FIG. 3 may include fetching the candidate entry list page using the selected link. For instance, the candidate entry list page 400 or 402 of FIG. 4A or FIG. 4B may be fetched. For simplicity in the discussion that follows, it is assumed that the candidate entry list page 400 of FIG. 4A is fetched using a corresponding link from the link list.

Figure 5:
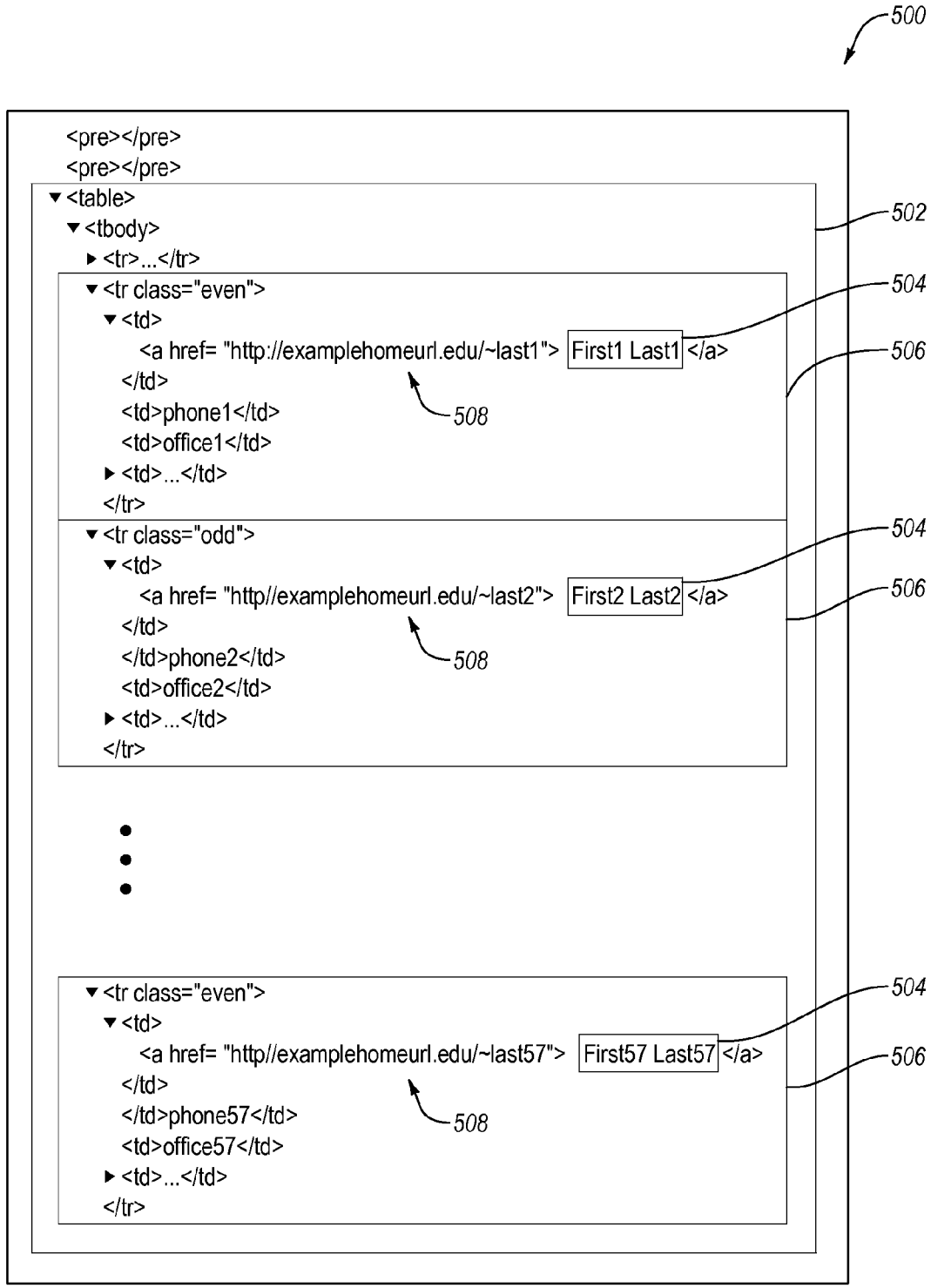
FIG. 5 illustrates an example document object model (DOM) tree into which the candidate entry list page of FIG. 4A may be parsed.

Verifying the candidate entry list page 400 as a candidate entry list page may additionally include parsing the candidate entry list page into a DOM tree. For instance, FIG. 5 illustrates an example DOM tree 500 into which the candidate entry list page 400 of FIG. 4A may be parsed, arranged in accordance with at least some embodiments described herein.

Verifying the candidate entry list page 400 may additionally include scanning the DOM tree 500 for a preselected repeated pattern, detecting the preselected repeated pattern in the DOM tree 500, and generating a list of detected instances of the preselected repeated pattern. In the illustrated embodiment, the preselected repeated pattern that is scanned and detected is a repeating pattern 504 of names. More generally, the preselected repeated pattern may include a repeating pattern of names, phone numbers, office locations, email addresses, a price number (e.g., a price for each product in a product listing), or the like or any combination thereof. In these and other embodiments, a database of specific patterns and/or rules may be referenced when scanning a DOM tree and detecting the preselected repeated pattern. After being verified as an entry list page, e.g., at block 304 of FIG. 3, the candidate entry list page 400 is an entry list page (without the term "candidate") and will be referred to as such in the discussion that follows.

In some embodiments, segmenting the entry list page into a plurality of entry items at block 306 of FIG. 3 may include detecting a DOM level in the DOM tree where each of the detected instances of the repeating pattern is in a different branch of the DOM tree, selecting the detected DOM level as a border of the entry items, and segmenting the entry list page into the different branches of the DOM tree where each of the different branches corresponds to a different one of the entry items. For example, with combined reference to FIGS. 4A and 5, a main branch 502 DOM level of the DOM tree 500 corresponds to the table 404 of the entry list page 400. At a DOM level corresponding to branches 506, each of the detected instances of the repeating pattern 504 is in a different branch 506 of the DOM tree 500. The DOM level corresponding to the branches 506 is selected as a border of the entry items 406 and the entry list page 400 is segmented into the different branches 506 of the DOM tree 500, each of the different branches 506 corresponding to a different one of the entry items 406.

In some embodiments, extracting from the plurality of entry items a plurality of candidate target pages at block 308 of FIG. 3 may include, for each corresponding entry item, identifying one or more links in the entry item where the one or more links each point to a corresponding one of the plurality of candidate target pages. For example, the name in each entry item 406 of the entry list page 400 of FIG. 4A may be anchor text pointing to a home page of the corresponding faculty member. Example URLs corresponding to such anchor text that are hidden when the entry list page 400 is rendered as shown in FIG. 4A are illustrated in the DOM tree 500 of FIG. 5 at 508. More generally, each of the entry items 406 may include links in the form of anchor text, URLs, and/or other links that each points to a corresponding candidate target page.

In these and other embodiments, a candidate link list may be created for each entry item that includes all of the links extracted from the entry item. If the candidate link list is empty for a given entry item, that entry item may be skipped. If the candidate link list includes a single link, the corresponding candidate target page may be fetched and verified as described below. If the candidate link list includes multiple links, the links may be ranked based on likelihood of pointing to a desired target page or some other criteria.

For example, if the desired target pages are home pages of faculty members, links such as anchor text with the faculty member's name (e.g., first name, last name, abbreviations thereof, or combinations thereof), or the term "home," or the term "home page," or other suitable terms in the anchor text, and/or links such as URLs with the symbol "~," or the term "people," or the term "faculty," or other suitable term in the URL, may be more likely to point to a faculty member's home page than links lacking such features. As another example, if the desired target pages are detailed product pages of products, links such as anchor text with the name of the product, the term "detail," or other suitable terms in the anchor text, or links such as URLs with corresponding symbols or terms that are indicative of a detailed product page, may be more likely to point to a detailed product page than links that lack such features.

The links in the candidate link list may be processed in descending order beginning with those that have a higher likelihood of pointing to a desired target page until a candidate target page is verified as a target page as described in more detail below. Whether or not the links in the candidate link list are ordered, at least one of the links may be "popped" or selected for further processing to verify whether the corresponding candidate target page is a target page.

In general, verifying at least some of the candidate target pages as target pages including analyzing a visual structure and presentation of the candidate target pages at block 310 of FIG. 3 may include classifying the candidate target pages as belonging to a desired genre (e.g., being a desired target page) by machine learning as described in more detail below. If a candidate target page pointed to by a link in the candidate link list for an entry item is not verified as a target page, a next link in the candidate link list may be selected for verification until at least one of the corresponding candidate target pages is verified as a target page or all of the links in the candidate link list have been processed, whichever occurs first, after which the candidate link list for the next entry item may be processed.

Figure 6:
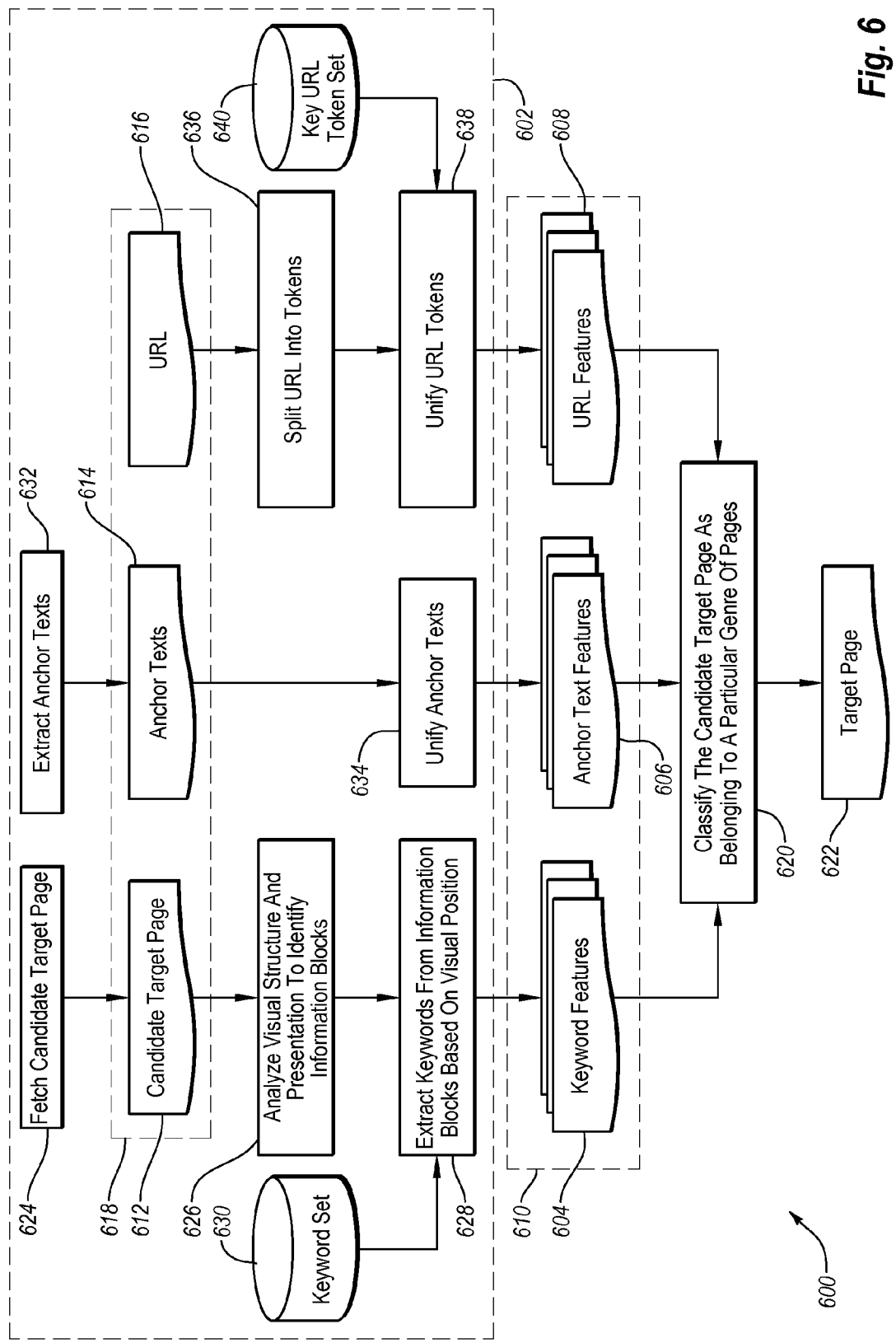
FIG. 6 shows an example flow diagram of a method of verifying at least some candidate target pages as target pages including analyzing a visual structure and presentation of the candidate target pages.

FIG. 6 shows an example flow diagram of a method 600 of verifying at least some of the candidate target pages as target pages including analyzing a visual structure and presentation of the candidate target pages, arranged in accordance with at least one embodiment described herein. The method 600 may correspond to block 310 of FIG. 3. The method 600, in some embodiments, is performed by the verification module 212 of FIG. 2, or more particularly by the processor 202 executing the verification module 212. Although illustrated as discrete blocks, various blocks may be divided into additional blocks, combined into fewer blocks, or eliminated, depending on the desired implementation.

The method 600 may begin at block 602 in which one or more keyword features 604, anchor text features 606, and/or URL features 608 (collectively "features 610") are generated. The features 610 may be generated from a candidate target page 612, anchor texts 614 in a corresponding entry list page (not shown) that point to the candidate target page 612, and/or a URL 616 of the candidate target page 612 (collectively "inputs 618"). At block 620, the method 600 may include classifying the candidate target page 612 as belonging to (or not belonging to) a particular genre of pages based on the features 610. If the candidate target page 612 is classified as belonging to the particular genre of pages, it may be saved, e.g., in the one or more databases 204 of FIG. 2, as a target page 622 and/or the target page 622 may be processed further as described herein. If the candidate target page 612 is not classified as belonging to the particular genre of pages, the method 600 may start over with a new candidate target page.

Generating the one or more features 610 at block 602 may include one or more of the following sub-blocks associated with generating the keyword features 604, the anchor text features 606, and/or the URL features 608. For example, the sub-blocks associated with generating the keyword features 604 may include sub-blocks 624, 626, and 628. At sub-block 624, the candidate target page 612 may be fetched using a corresponding one of the links from the candidate link list of the entry item. At sub-block 626, a visual structure and presentation of the candidate target page may be analyzed to identify information blocks. In some embodiments, the analysis at sub-block 626 involves or is based on methods described in U.S. Patent Publication No. 20050066269, which patent publication is herein incorporated by reference in its entirety. At sub-block 628, keywords may be extracted from the information blocks based on visual position within the information blocks and a keyword set 630.

Figure 7A:
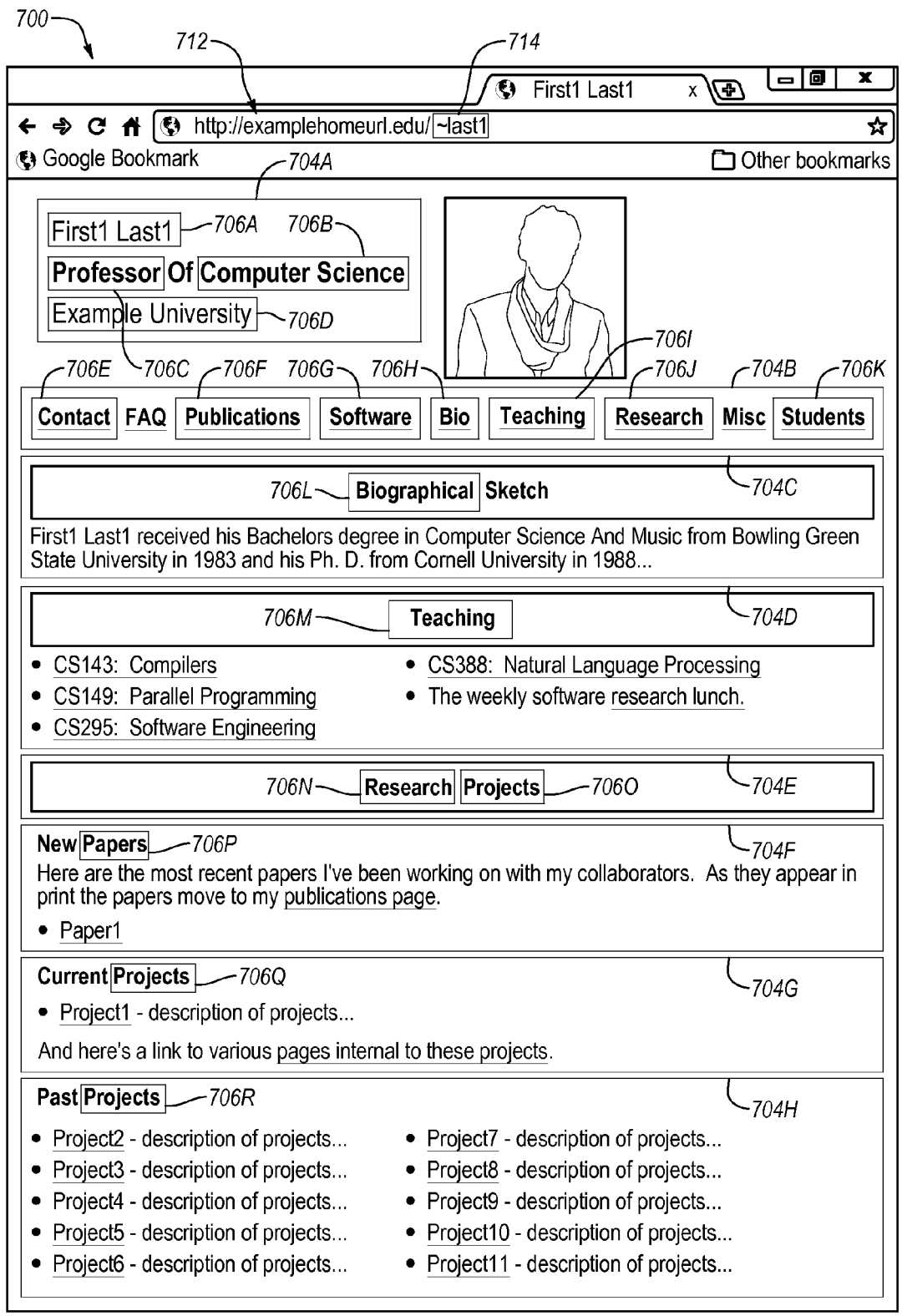
FIGS. 7A and 7B include screenshots of example candidate target pages that may be processed according to the method of FIG. 6.
Figure 7B:
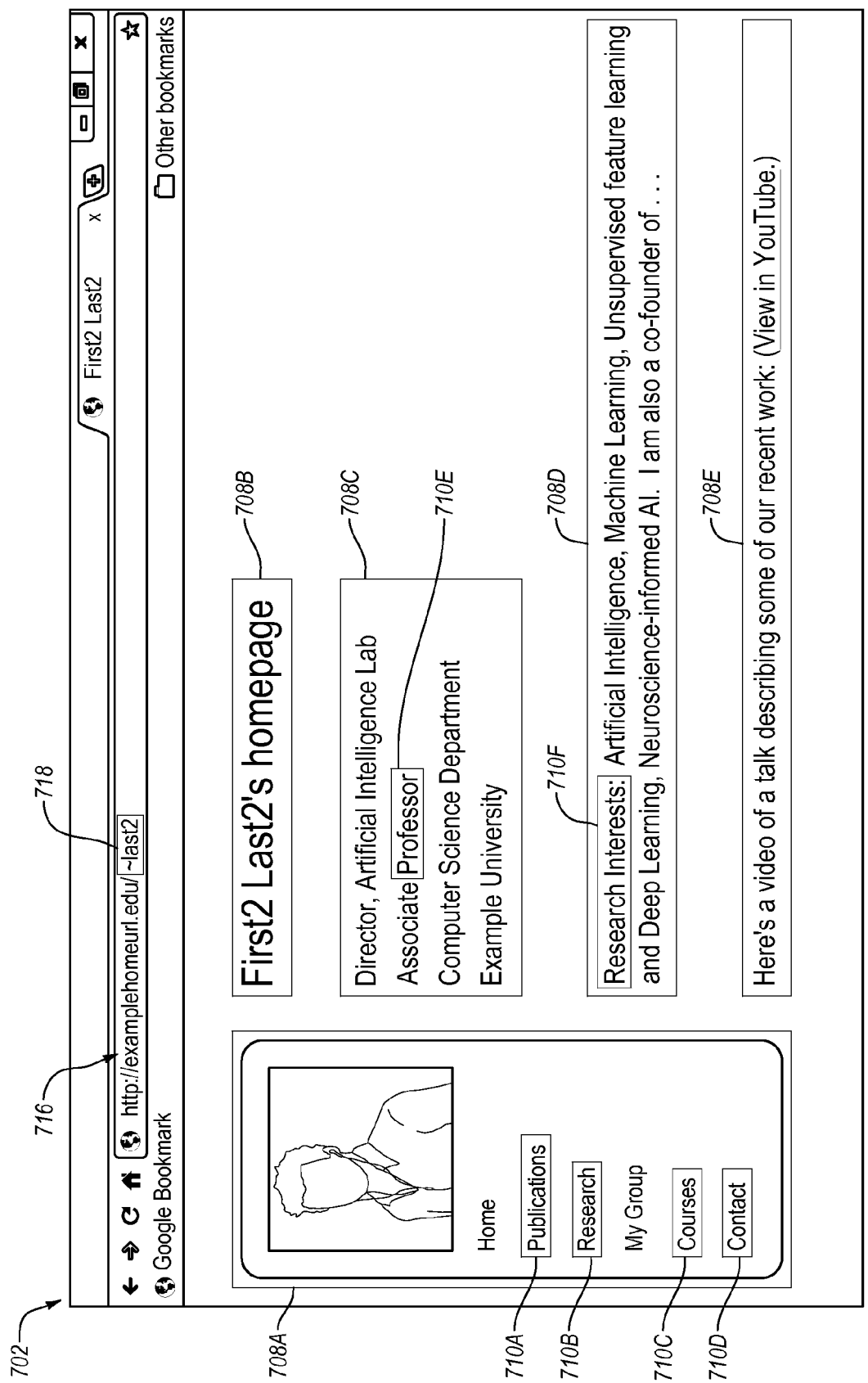

FIGS. 7A and 7B include screenshots of example candidate target pages 700, 702 that may be processed according to the method 600 of FIG. 6, arranged in accordance with at least some embodiments described herein. In more detail, FIG. 7A depicts an example home page of the first faculty member (e.g., First1 Last1) listed in FIG. 4A, and FIG. 7B depicts an example home page of the second faculty member (e.g., First2 Last2) listed in FIG. 4A.

As illustrated, the analysis of the visual structure and presentation of the candidate target page 700 of FIG. 7A at sub-block 626 of FIG. 6 may identify information blocks 704A-704H (collectively "information blocks 704") in the candidate target page 700. Keywords may then be extracted from the information blocks 704 at sub-block 628 of FIG. 6 based on visual positions within the information blocks 704. For instance, certain visual positions of each information block may be searched for any of the keywords in the keyword set 630; if any of the keywords are found in the visual positions, they may be extracted as the keyword features 604 of FIG. 6.

The visual positions that are searched may include, but are not limited to, information block titles, such as text having fewer than a first threshold number of characters and visually presented on its own line within a corresponding one of the information blocks 704, text having fewer than a second threshold number of characters and immediately followed by a colon within a corresponding one of the information blocks 704, a head of a table within a corresponding one of the information blocks 704, or the like or any combination thereof. The first and second thresholds may be the same or different.

The particular keywords in the keyword set 630 of FIG. 6 may depend on the desired target pages. Where the desired target pages are home pages of faculty members of a computer science department, for example, the keywords in the keyword set may include, but are not limited to, professor, computer science, university, college, contact, publications, articles, papers, projects, software, bio, biographic, courses, teaching, research, research interests, or the like or any combination thereof. The foregoing are merely examples of keywords that may be included in the keyword set 630 and should not be construed to limit the embodiments described herein. Various keywords extracted from eligible visual positions in the information blocks 704 of FIG. 7A are denoted at 706A-706R (collectively "keywords 706"). In general, the extracted keywords, their positions within the corresponding information blocks, and/or other information may be included in the keyword features 604 of FIG. 6.

FIG. 7B illustrates another example in which information blocks 708A-708E (collectively "information blocks 708") have been identified and keywords 710A-710F (collectively "keywords 710") have been extracted therefrom.

Returning to FIG. 6, the sub-blocks associated with generating the anchor text features 606 may include sub-blocks 632 and 634. At sub-block 632, anchor texts 614 may be extracted from the entry list page that points to the candidate target page 612. At sub-block 634, the anchor texts 614 may be unified. As an example, an anchor text including a name of a faculty member may be unified as "name." As another example, anchor text including a course name and/or a course number may be unified as a single term, such as "course" or other suitable term.

Figure 10:
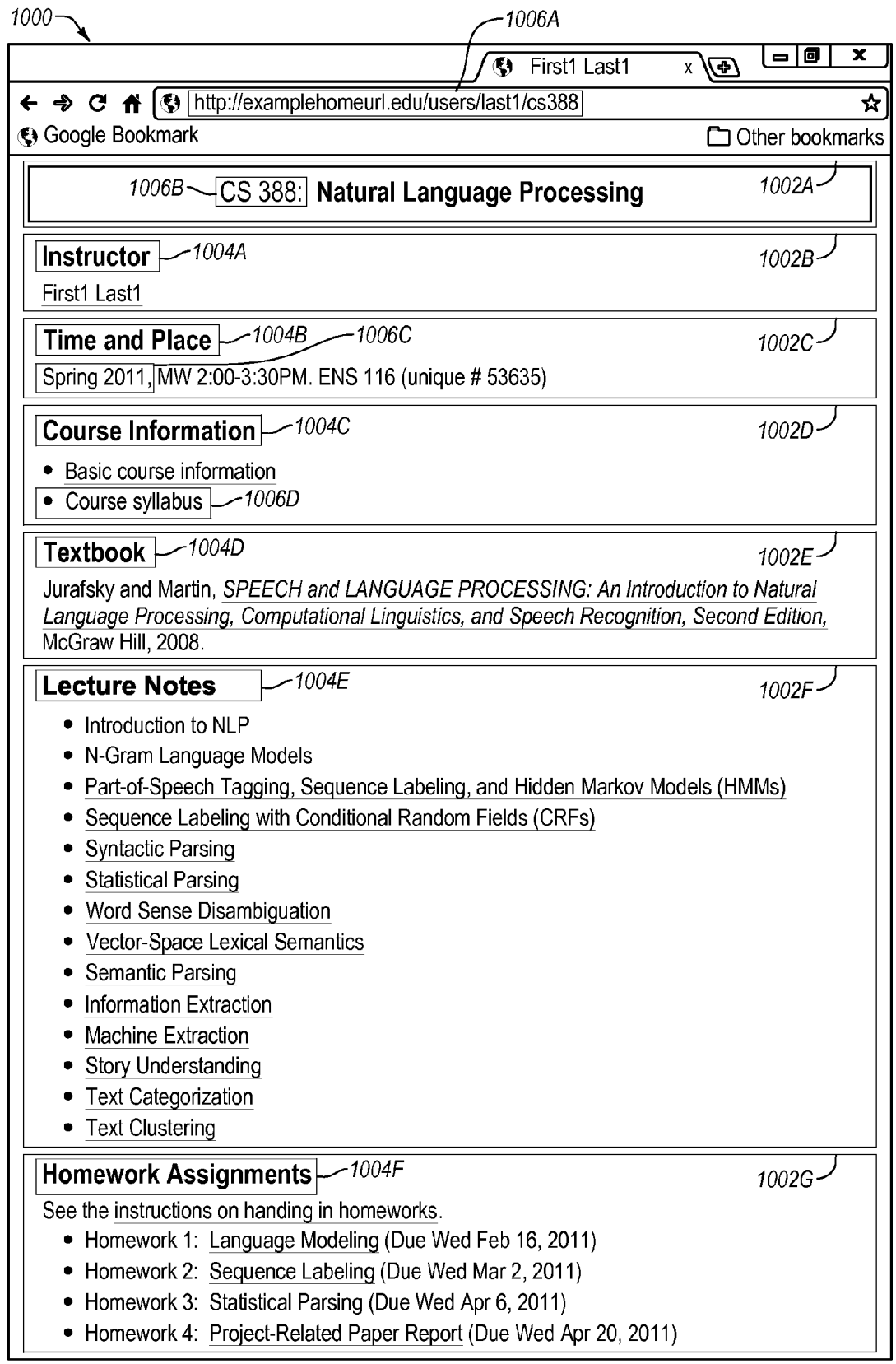

In general, when a professor's home page is the target page, then the anchor text extracted as the anchor text features 606 may be on a corresponding faculty directory page. For example, with combined reference to FIGS. 4A, 6, and 7A, suppose "First1 Last1" is an anchor text in the entry list page 400 that points to the candidate target page 700. Thus, "First1 Last1" may be extracted as an anchor text feature 606 from the entry list page 400 and may be unified as "name." Alternately, when a course page is the target page, then the anchor text extracted as the anchor text features 606 may be in a corresponding course information block. For example, as described in more detail below, FIG. 10 illustrates a course page that may be pointed to by anchor text including the course number/course name pair "CS388: Natural Language Processing" in the information block 704D. The course number/course name pair may be extracted as an anchor text feature 606 from the information block 704D and may be unified as, e.g., "course."

Returning to FIG. 6, the sub-blocks associated with generating the URL features 608 may include sub-blocks 636 and 638. At sub-block 636, the URL of the candidate target page 612 may be split into tokens. At sub-block 638, the URL tokens may be unified based on a key URL token set 640. For example, in FIG. 7A, a URL 712 of the candidate target page 700 may be split into tokens that include a token 714 including a name (or at least a portion of a name) of the faculty member corresponding to the candidate target page 700 of FIG. 7A. As another example, in FIG. 7B, a URL 716 of the candidate target page 702 may be split into tokens that include a token 718 including a name (or at least a portion of a name) of the faculty member corresponding to the candidate target page 702 of FIG. 7B. The tokens 714, 718 of FIGS. 7A and 7B may be unified as name tokens according to rules or patterns in the key URL token set 640. Other types of unified URL tokens may be unified in sub-block 638. In general, the unified URL tokens, and/or other information may be included in the URL features 608 of FIG. 6.

To improve performance by reducing the dimension of features extracted at block 602 of FIG. 6, the keyword set 630 and the key URL token set 640 may be provided to refine feature selection. The keyword set 630 and/or the key URL token set 640 may be automatically generated from existing collected target pages and corresponding URLs collected from various websites where the collected target pages belong to a same genre. For example, multiple manually collected and verified target pages may undergo visual presentation analysis to identify information blocks and text words may be extracted from eligible visual positions. Additionally, URLs of the collected and verified target pages may be split into tokens. All extracted keywords and URL tokens may be analyzed to extract text words and/or URL tokens that occur across the collected and verified target pages with a frequency above a specified threshold. Such text words may be included in the keyword set 630 and such URL tokens may be included in the key URL token set 640.

At block 620 of FIG. 6, the candidate target page 612 may be classified as belonging to a particular genre (or not) based on one or more of the features 610 extracted from the candidate target page 612. The classification algorithm used at block 620 may include a decision tree, SVM, Navie Bayes, or the like or any combination thereof. In some embodiments, the classification algorithm may be trained by machine learning. For example, features may be extracted from multiple verified target pages and may be provided as positive training data to a machine learning engine, such as a decision tree. Similarly, features may be extracted from multiple verified non-target pages (e.g., pages that have been verified as not being target pages) and may be provided as negative training data to the machine learning engine. The verified target pages and the verified non-target pages may be verified manually in some embodiments. The machine learning engine may then generate the classification algorithm by machine learning from the positive and negative training data.

Returning to FIG. 3, in some embodiments, extracting metadata from the target pages at block 312 may generally include extracting any information acquired during processing of the entry list page (e.g., blocks 302, 304, and/or 306) and/or extracting metadata by identifying particular information blocks in the target pages. When the target page is a detailed product page, for example, extracting metadata from the target page may include extracting at least one of a name of the product, a price of the product, a name of the manufacturer of the product, a name of the merchant selling the product, specifications associated with the product, customized prices associated with the product, or the like or any combination thereof. In these and other embodiments, the one or more databases 204 of FIG. 2 may include a database of products and associated prices that may be accessed by the users 108 of FIG. 1 to do product and/or price comparison queries by the users 108.

Alternately or additionally, when the target page is a home page of a faculty member associated with an educational institution, extracting metadata from the target page may include extracting at least one of a name of the faculty member, a name of the educational institution, a course information block including one or more courses taught by the faculty member, and/or one or more publications by the faculty member. In these and other embodiments, the one or more databases 204 of FIG. 2 may include a database of faculty members, a database of courses, and/or a database of learning materials that may be accessed by the users 108 of FIG. 1 to do scholar queries, course queries, publication queries, and/or learning material queries by the users 108.

Figure 8:
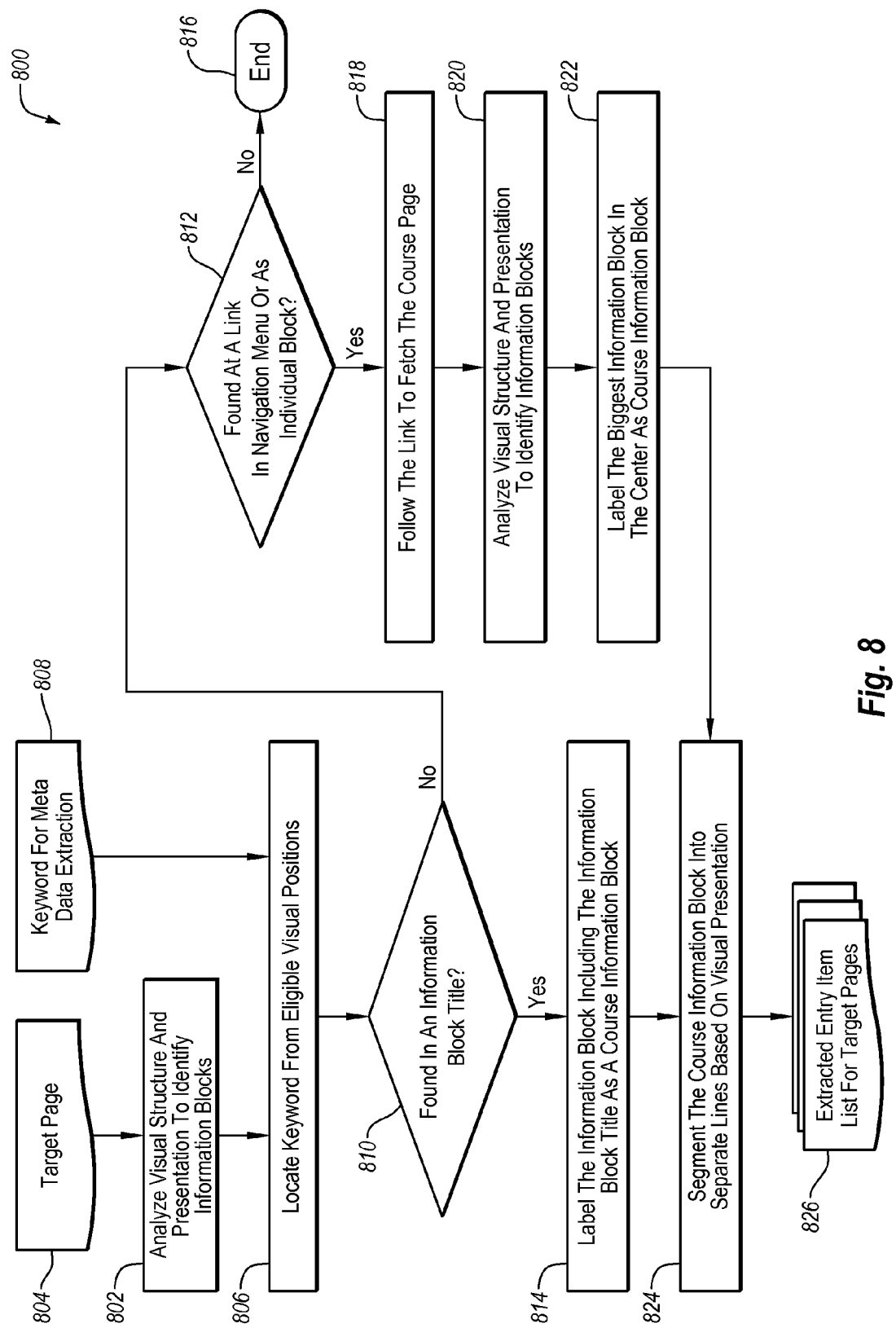
FIG. 8 shows an example flow diagram of a method of extracting course metadata from faculty member home pages.

FIG. 8 shows an example flow diagram of a method 800 of extracting course metadata from faculty member home pages, arranged in accordance with at least some embodiments described herein. The method 800 may correspond to block 312 of FIG. 3, although the method 800 is primarily concerned with extracting one type of metadata, e.g., course metadata, whereas block 312 of FIG. 3 may involve extracting the same and/or other types of metadata. Although illustrated as discrete blocks, various blocks may be divided into additional blocks, combined into fewer blocks, or eliminated, depending on the desired implementation.

The method 800 of FIG. 8 may overlap with the method 600 of FIG. 6 and/or may include some of the same blocks and/or sub-blocks as in FIG. 6. For instance, the method 800 of FIG. 8 may include, at block 802, analyzing a visual structure and presentation of a target page 804 to identify information blocks, which may correspond to the sub-block 626 of FIG. 6. The method 800 of FIG. 8 may additionally include, at block 806, locating one or more keywords 808 (e.g., from a corresponding keyword set such as the keyword set 630) in one or more eligible visual positions of the identified information blocks, which may correspond to sub-block 628 of FIG. 6. In the example of FIG. 8, the located keyword may include "course," "courses," "teaching," "class," "classes," or some other keyword indicating courses taught by the faculty member. As used herein, "course" or "courses" broadly refers to all courses, classes, teaching, etc. taught by the faculty member.

At block 810, it is determined whether the keyword is found in an information block title. If the keyword is not found in an information block title ("No" at block 810), the method 800 proceeds to block 812. If the keyword is found in an information block title ("Yes" at block 810), the method 800 proceeds to block 814.

At block 814, the information block that includes the information block title is labeled a course information block if the keyword is located in the information block title of the information block.

Alternately, at block 812, if the keyword is not located in the information block title of the information block, it is determined whether the keyword is found at a link (e.g., as anchor text) in a navigation menu or as an individual block. If the keyword is not found at a link in a navigation menu or as an individual block ("No" at block 812), the method ends at block 816.

If the keyword is found at a link in a navigation menu or as an individual block ("Yes" at block 812), the method proceeds to block 818. At block 818, the link is followed to fetch a corresponding course page. At block 820, a visual structure and presentation of the course page is analyzed to identify information blocks as described elsewhere herein. At block 822, a biggest information block in the center of the course page is labeled as the course information block.

At block 824, whether the course information block is identified in the target page 804 or in a separate course page pointed to by a link on the target page 804, the course information block is segmented into separate lines based on visual presentation as described elsewhere herein. Although not illustrated in FIG. 8, the course information block may be extracted as metadata.

With combined reference to FIGS. 7A and 8, an example of some portions of the method 800 of FIG. 8 will be described.

In this example, it is assumed that the keyword 808 is "teaching." At 806, "teaching" is located in an eligible visual position, e.g., as keyword 706M, 808 visually presented on its own line at the top of information block 704D. At 810, it is determined that "teaching" is found in an information block title since "teaching" is at the top of the information block 704D. At 814, the information block 704D is labeled as a course information block. Then, at block 824, and although not shown in FIG. 7A, the information block 704D may be segmented into separate lines based on visual presentation, each of the separate lines corresponding to a different course.

With combined reference to FIGS. 7B-9, another example of some portions of the method 800 of FIG. 8 will be described. In this example, it is assumed that the keyword 808 is "courses." At 806, "courses" is located in an eligible visual position, e.g., as keyword 710C, 808 in the navigation menu information block 708A. At 810, it is determined that "courses" is not found in an information block title since it is not in a position within the navigation menu information block 708A that is interpreted as a title position. At 812, it is determined that "courses" is found at a link, e.g., as an anchor text, in the navigation menu information block 708A. At 818, the link is followed to fetch a corresponding course page 902 illustrated as an overlay over the candidate target page 702 in FIG. 9. At 820, a visual structure and presentation of the course page 902 is analyzed to identify information blocks; in the example of FIG. 9, there is a single information block illustrated in the course page 902. At 822, the information block in the course page 902 is labeled as a course information block. Then, at block 824, and although not shown in FIG. 9, the information block labeled as the course information block may be segmented into separate lines based on visual presentation, each of the separate lines corresponding to a different course.

Figure 9:
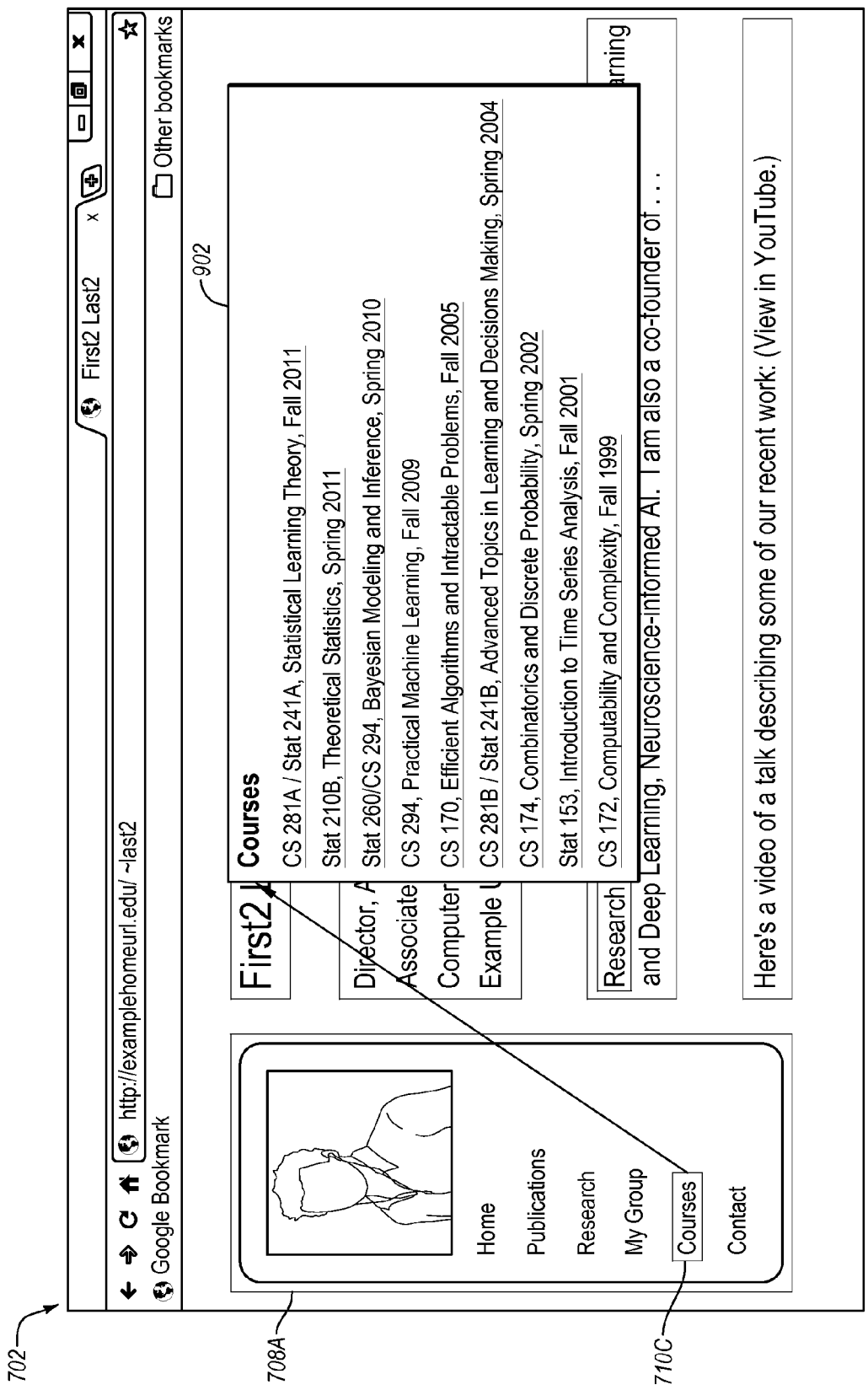
FIG. 9 includes a screenshot of the candidate target page of FIG. 7B with an overlay including a course page pointed to by a link in the candidate target page.

Returning to FIG. 3, in some embodiments, determining whether there is an entry list page at a current level at block 316 includes determining whether the target page includes a course information block, e.g., as in FIG. 7A, or a link to a course information block on a separate page, e.g., as in FIGS. 7B and 9. If so, the method 300 returns to block 306, taking the course information block as the entry list page.

In more detail, at block 306, the course information block may be segmented into an entry list of candidate course pages which are treated as candidate target pages as the method 300 proceeds. At blocks 308 and 310, the candidate course pages may be extracted and verified as course pages, including analyzing a visual structure and presentation of the candidate course pages as generally described above. At block 312, course metadata may be extracted from the course pages including, for at least one of the course pages, a learning materials information block. At block 314, the course pages and/or the metadata extracted therefrom may be organized in the one or more databases. At block 316, determining whether there is an entry list page at the current level, e.g., the level of each course page, may include determining whether the course page includes a learning materials information block. The method 300 may then return to block 306 yet again, taking the learning materials information block as the entry list page.

In particular, at block 306, the learning materials information block may be segmented into an entry list of candidate learning materials. At blocks 308 and 310, the candidate learning materials may be extracted and verified as learning materials. At block 312, metadata may be extracted from the learning materials. At block 314, the learning materials and/or the metadata extracted therefrom may be organized in the one or more databases. Accordingly, at least some portions of the method 300 of FIG. 3 may be iterated multiple times to identify and extract resources.

An example of at least some of the foregoing iterations will now be described with combined reference to FIGS. 3, 7A, and 10. At block 316, it is determined whether there is an entry list page at a current level, e.g., at the level of the candidate target page 700. As mentioned, the determination at block 316 may include determining whether the candidate target page 700 includes a course information block. In this case, the candidate target page 700 includes the course information block 704D, so the method 300 returns to block 306, taking the course information block 704D as the entry list page.

At block 306, the course information block 704D may be segmented into an entry list of candidate course pages which are treated as candidate target pages as the method 300 proceeds. The candidate course pages may include, in the example of FIG. 7A, "CS143: Compilers," "CS149: Parallel Programming," "CS295: Software Engineering," "C5388: Natural Language Processing," and "The weekly software research lunch." At blocks 308 and 310, the foregoing candidate course pages may be extracted and verified, or not verified, as the case may be. For instance, the first four candidate course pages may be verified as such, while the "The weekly software research lunch" candidate course page may not be verified as a candidate course page. The candidate course pages may be extracted from the course information block 704D and verified as generally described above. An example of one of the candidate course pages that may be verified is illustrated in FIG. 10.

In more detail, FIG. 10 includes a screenshot of an example candidate course page 1000 corresponding to the "CS388: Natural Language Processing" candidate course page listed in the course information block 704D of FIG. 7A, arranged in accordance with at least some embodiments described herein. Verifying the candidate course page 1000 as a course page may involve, as generally described above, fetching the candidate course page 1000 using a link provided in the course information block 704D of FIG. 7A; in this example, the text "CS388: Natural Language Processing" in FIG. 7A may be anchor text that is the link to the candidate course page 1000 of FIG. 10. The visual structure and presentation of the candidate course page 1000 is also analyzed to identify information blocks 1002A-1002G (collectively "information blocks 1002") as described above. Keywords 1004A-1004F (collectively "keywords 1004") may be extracted from the information blocks 1002 based on visual positions of the keywords 1004 within the information blocks 1002 to generate keyword features as described above. Alternately or additionally, anchor text features and/or URL features may also be generated. The candidate course page 1000 may then be classified as belonging to a particular genre of pages (or not) and thus may be verified (or not verified) as a course page based on the keyword features, the anchor text features, and/or the URL features.

At block 312, course metadata 1006A-1006D (collectively "course metadata 1006") may be extracted from the course page 1000. The course metadata 1006 may include, but is not limited to, a URL 1006A of the course page 1000, a course number 1006B, a semester 1006C in which the course is or was or will be taught, and/or a course syllabus 1006D. The extracted course metadata 1006 may alternately or additionally include the information blocks 1002, the keywords 1004, and/or any information derived therefrom. More generally, the course metadata 1006 may include, but is not limited to, a course name, a course number or ID, a course date, a course instructor, an educational institution at which the course is taught, course learning materials, course assignments, related projects, previous and/or practice exams, a course teaching assistant, classroom in which the course is taught, class hours, office hours, or the like or any combination thereof.

At block 314, the extracted course metadata may be organized into the one or more databases. At block 316, determining whether there is an entry list page at the current level, e.g., the level of the candidate course page 1000, may include determining whether the candidate course page 1000 includes a learning materials information block.

In the present example, the information block 1002F includes the keyword 1004E in a visual position that may indicate that the information block 1002F is a learning materials information block. The method 300 may then generally repeat beginning at block 306, taking the learning materials information block 1002F as the entry list page to extract the learning materials in the form of lecture slides from the candidate course page 1000 and to organize the extracted learning materials in the one or more databases.

Accordingly, some embodiments described herein identify and extract distributed online resources and organize such resources or information associated therewith in one or more databases. The resource metadata, such as course metadata, may be mapped and unified in a semi-automatic ontology construction. Alternately or additionally, resource metadata, such as course metadata, may be aggregated and clustered which may facilitate discovery and comparison of similar courses offered by various educational institutions, or in the case of product metadata, may facilitate discovery and comparison of similar or identical products available from a variety of sources.

To illustrate one use of some embodiments described herein, consider an individual (e.g., faculty member, researcher, professor, lecturer, etc.) who has published academic articles and has a name which is shared by other individuals that have also published academic articles. Running a name query in some existing databases of academic articles may return articles by all of the researchers that share the name. In some embodiments described herein, however, biographical information may be associated in the one or more databases with each individual and with the corresponding publications of the individual. Thus, queries run by the users according to some embodiments described herein may allow the users to specify or select a particular individual with distinguishing biographical information, even if the individual has a shared name, to exclude publications by the other individuals that share the name.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include tangible computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of automatically identifying and extracting distributed online resources, the method comprising:
   locating in a website a candidate entry list page;
   verifying the candidate entry list page as an entry list page using repeated pattern discovery;
   segmenting the entry list page into a plurality of entry items;
   extracting from the plurality of entry items a plurality of candidate target pages, wherein extracting from the plurality of entry items a plurality of candidate target pages comprises, for each corresponding entry item, identifying one or more links in the entry item, the one or more links each pointing to a corresponding one of the plurality of candidate target pages;
   verifying at least one of the candidate target pages as a target page including:
      fetching the at least one of the candidate target pages using a corresponding one of the one or more links;
      analyzing a visual structure and presentation of the at least one of the candidate target pages to identify one or more information blocks in the at least one of the candidate target pages;
      extracting one or more keyword features from the one or more information blocks;
      classifying the at least one of the candidate target pages as belonging to a particular genre of pages based at least on the one or more keyword features;
   extracting metadata from the target page; and
   organizing the target page and the metadata in one or more databases.

2. The method of claim 1, wherein locating in the website the candidate entry list page comprises:
   running a keyword search for a target keyword in links in a home page of the website, each link including at least one of anchor text and a uniform resource locator (URL);
   creating a link list including links in which the target keyword is found; and
   selecting a link from the link list, the link pointing to the candidate entry list page.

3. The method of claim 2, wherein verifying the candidate entry list page as the entry list page using repeated pattern discovery comprises:
   fetching the candidate entry list page using the selected link;
   parsing the candidate entry list page into a document object model (DOM) tree;
   scanning the DOM tree for a preselected repeated pattern;
   detecting the preselected repeated pattern in the DOM tree; and
   generating a list of detected instances of the preselected repeated pattern.

4. The method of claim 3, wherein segmenting the entry list page into the plurality of entry items comprises:
   detecting a DOM level in the DOM tree where each of the detected instances is in a different branch of the DOM tree;
   selecting the detected DOM level as a border of the plurality of entry items; and
   segmenting the entry list page into the different branches of the DOM tree, each of the different branches corresponding to a different one of the plurality of entry items.

5. The method of claim 1, wherein
the one or more keywords are extracted from the one or more information blocks based on a visual position of each of the one or more keywords within a corresponding one of the one or more information blocks.

6. The method of claim 5, wherein:
each of the one or more keywords extracted from the one or more information blocks matches a corresponding keyword in a preselected keyword set; and
each of the one or more keywords extracted from the one or more information blocks includes:
   an information block title including text having fewer than a first threshold number of characters and visually presented on its own line within a corresponding one of the one or more information blocks;
   text having fewer than a second threshold number of characters and immediately followed by a colon within a corresponding one of the one or more information blocks; and
   a head of a table within a corresponding one of the one or more information blocks.

7. The method of claim 5, wherein verifying the at least one of the candidate target pages further comprises:
   generating one or more anchor text features including:
      extracting one or more anchor texts from the entry list page; and
      unifying each of the one or more anchor texts;
   generating one or more uniform resource locator (URL) features including:
      splitting a URL of the at least one of the candidate target pages into one or more URL tokens; and
      unifying each of the one or more URL tokens; and
   classifying the at least one of the candidate target pages as belonging to the particular genre of pages further based on the one or more anchor text features and the one or more URL features.

8. The method of claim 1, wherein the target page comprises a detailed product page of a corresponding product associated with a corresponding merchant and wherein extracting metadata from the target page comprises extracting at least one of: a name of the corresponding product, a price of the corresponding product, a name of the corresponding merchant, specifications associated with the corresponding product, or customized prices associated with the corresponding product.

9. The method of claim 8, wherein the one or more databases include a database of products and associated prices, the method further comprising providing online access to the database of products and associated prices for product and price comparison queries by users.

10. The method of claim 1, wherein the target page comprises a home page of a corresponding faculty member associated with a corresponding educational institution and wherein extracting metadata from the target page comprises extracting at least one of: a name of the corresponding faculty member, a name of the corresponding educational institution, a course information block including one or more courses taught by the corresponding faculty member, and/or one or more publications by the corresponding faculty member.

11. The method of claim 10, further comprising:
segmenting the course information block into an entry list of candidate course pages;
extracting and verifying at least some of the candidate course pages as course pages including analyzing a visual structure and presentation of the candidate course pages;
extracting course metadata from the course pages including, for at least one of the course pages, a learning materials information block;
segmenting the learning materials information block into an entry list of candidate learning materials;
extracting and verifying at least some of the candidate learning materials as learning materials; and
organizing the course metadata and learning materials in the one or more databases.

12. The method of claim 11, wherein the one or more databases include at least one of: a database of faculty members, a database of courses, and a database of learning materials, the method further comprising providing online access to the database of faculty members, the database of courses, and/or the database of learning materials for scholar queries, course queries, publication queries, and/or learning material queries by users.

13. A system for automatically identifying and extracting distributed online resources, the system comprising:
a processor;
one or more databases communicatively coupled to the processor; and
a tangible computer-readable storage medium communicatively coupled to the processor and having computer-executable instructions stored thereon that are executable by the processor to perform operations comprising:
locating in a website a candidate entry list page;
verifying the candidate entry list page as an entry list page using repeated pattern discovery;
segmenting the entry list page into a plurality of entry items;
extracting from the plurality of entry items a plurality of candidate target pages, wherein extracting from the plurality of entry items a plurality of candidate target pages comprises, for each corresponding entry item, identifying one or more links in the entry item, the one or more links each pointing to a corresponding one of the plurality of candidate target pages;
verifying at least one of the candidate target pages as a target page including:
fetching the at least one of the candidate target pages using a corresponding one of the one or more links;
analyzing a visual structure and presentation of the at least one of candidate target pages to identify one or more information blocks in the at least one of the candidate target pages;
extracting one or more keyword features from the one or more information blocks;
classifying the at least one of the candidate target pages as belonging to a particular genre of pages based at least on the one or more keyword features;
extracting metadata from the target page; and
organizing the target page and the metadata in one or more databases.

14. The system of claim 13, wherein the target page comprises a detailed product page of a corresponding product associated with a corresponding merchant and wherein extracting metadata from the target page comprises extracting at least one of: a name of the corresponding product, a price of the corresponding product, a name of the corresponding merchant, specifications associated with the corresponding product, or customized prices associated with the corresponding product.

15. The system of claim 14, wherein the one or more databases include a database of products and associated prices, the operations further comprising providing online access to the database of products and associated prices for product and price comparison queries by users.

16. The system of claim 13, wherein the target page comprises a home page of a corresponding faculty member associated with a corresponding educational institution and wherein extracting metadata from the target page comprises extracting at least one of: a name of the corresponding faculty member, a name of the corresponding educational institution, a course information block including one or more courses taught by the corresponding faculty member, and/or one or more publications by the corresponding faculty member.

17. The system of claim 16, the operations further comprising:
segmenting the course information block into an entry list of candidate course pages;
extracting and verifying at least some of the candidate course pages as course pages including analyzing a visual structure and presentation of the candidate course pages;
extracting course metadata from the course pages including, for at least one of the course pages, a learning materials information block;
segmenting the learning materials information block into an entry list of candidate learning materials;
extracting and verifying at least some of the candidate learning materials as learning materials; and
organizing the course metadata and learning materials in the one or more databases.

18. The system of claim 17, wherein the one or more databases include a database of faculty members, a database of courses, and a database of learning materials, the operations further comprising providing online access to the database of faculty members, the database of courses, and/or the database of learning materials for scholar queries, course queries, publication queries, and/or learning material queries by users.

19. The system of claim 13, wherein:
analyzing the visual structure and presentation of the at least one of candidate target pages comprises:
generating the one or more keyword features, wherein the
one or more keywords are extracted from the information blocks based on a visual position of each of the one or more keywords within a corresponding one of the information blocks;
generating one or more anchor text features including:
extracting one or more anchor texts from the entry list page; and
unifying each of the one or more anchor texts; and
generating one or more uniform resource locator (URL) features including:
splitting a URL of the at least one of candidate target pages into one or more URL tokens; and
unifying each of the one or more URL tokens; and
classifying the at least one of candidate target pages as belonging to the particular genre of pages is further based on the one or more keyword features, the one or more anchor text features, and the one or more URL features.

\* \* \* \* \*